(12) United States Patent
Kopp et al.

(10) Patent No.: US 9,944,156 B2
(45) Date of Patent: Apr. 17, 2018

(54) CONVERTIBLE TOP WITH FRAME LOCKING MECHANISM

(71) Applicant: Webasto-Edscha Cabrio GmbH, Stockdorf (DE)

(72) Inventors: Georg Kopp, Plattling (DE); Franz Haberl, Wallerfing (DE)

(73) Assignee: WEBASTO-EDSCHA CABRIO GMBH, Stockdorf (DE)

( * ) Notice: Subject to any disclaimer, the term of this patent is extended or adjusted under 35 U.S.C. 154(b) by 0 days.

(21) Appl. No.: 15/205,370

(22) Filed: Jul. 8, 2016

(65) Prior Publication Data

US 2016/0318382 A1    Nov. 3, 2016

Related U.S. Application Data

(63) Continuation-in-part of application No. 14/230,693, filed on Mar. 31, 2014, now Pat. No. 9,409,469.

(30) Foreign Application Priority Data

Apr. 5, 2013  (DE) .................. 10 2013 103 407

(51) Int. Cl.
*B60J 7/185*    (2006.01)
*B60J 7/12*     (2006.01)

(52) U.S. Cl.
CPC .......... *B60J 7/1856* (2013.01); *B60J 7/1226* (2013.01)

(58) Field of Classification Search
CPC ...... B60J 7/1265; B60J 7/1855; B60J 7/1269; B60J 7/145; B60J 7/146; B60J 7/1851; B60J 7/19; B60J 7/196

USPC ...... 296/107.09, 107.01, 109, 223, 224, 116, 296/117, 128, 121; 292/300, 50, 95, 97, 292/51, 304, 194, 201, 197

See application file for complete search history.

(56) References Cited

U.S. PATENT DOCUMENTS 3,342,525 A * 9/1967 Griffin .................. B60J 7/19
                                                   296/121
3,442,551 A * 5/1969 Hussey ................ B60J 7/1273
                                                   296/117

(Continued)

FOREIGN PATENT DOCUMENTS

| DE | 29715271   U1 | 2/1999  |
|----|---------------|---------|
| DE | 102005043511 B4 | 2/2010 |
| DE | 1020111030791 A1 | 12/2012 |

*Primary Examiner* — D Glenn Dayoan
*Assistant Examiner* — Sunsurraye Westbrook
(74) *Attorney, Agent, or Firm* — Quarles & Brady LLP (57) ABSTRACT

A convertible top of a cabriolet vehicle includes a convertible top rod assembly movable between a closed position spanning a vehicle interior and a storage position. The top rod assembly includes a link arrangement on opposing sides of the assembly. The link arrangement includes a main link and a main column pivotably mounted on a main bearing, and a front-side first link element and a second link element. The second link element is rearward of the first link element in the closed position and connected to the first link element by a joint arrangement, wherein the first link element being pivotable relative to the second link element by an actuating link extending along the second link element. A knee lever arrangement connected to the first link element, the second link element, and the actuating link includes a closing bolt.

8 Claims, 6 Drawing Sheets

(56) References Cited

U.S. PATENT DOCUMENTS

| | | | |
|---|---|---|---|
| 5,533,777 A * | 7/1996 | Kleemann | B60J 7/1855 |
| | | | 296/107.08 |
| 5,839,778 A | 11/1998 | Schaible et al. | |
| 6,409,247 B1 * | 6/2002 | Maass | B60J 7/1265 |
| | | | 296/107.13 |
| 6,659,533 B1 | 12/2003 | Grubbs | |
| 6,692,061 B1 | 2/2004 | Willard | |
| 7,497,499 B2 | 3/2009 | Halbewiss et al. | |
| 8,424,952 B2 * | 4/2013 | Schmitt | B60J 7/198 |
| | | | 296/107.08 |
| 2006/0125280 A1 | 6/2006 | Guillez et al. | |
| 2008/0315633 A1 | 12/2008 | Antreich et al. | |

* cited by examiner

CONVERTIBLE TOP WITH FRAME LOCKING MECHANISM

CROSS REFERENCE TO RELATED APPLICATION

This application is a continuation-in-part of U.S. patent application Ser. No. 14/230,693 filed on Mar. 31, 2014, which claims the priority benefit of German Patent Application No. 10 2013 103 407.1 filed on Apr. 5, 2013, both of which is fully incorporated herein by reference.

STATEMENT REGARDING FEDERALLY SPONSORED RESEARCH OR DEVELOPMENT

Not applicable.

FIELD OF THE INVENTION

The invention relates to a convertible top of a cabriolet vehicle.

BACKGROUND OF THE INVENTION

A convertible top of this kind is known from practice and comprises a convertible top rod assembly, which, for expanding a convertible top cover, is adjustable between a closed position spanning a vehicle interior and a storage position opening the vehicle interior toward the top. In the storage position, the convertible top rod assembly is stored in a rear-side convertible top storage box together with the convertible top cover. Alternatively, instead of a convertible top cover, rigid roof segments can be mounted on the convertible top rod assembly, which form a rigid roof of the respective vehicle in the closed position. In that case, the roof would be a so-called RHT (retractable hard top). The convertible top rod assembly comprises a link arrangement on both sides, respectively, in relation to a vertical longitudinal center plane of the convertible top, said link arrangement comprising a main link and a main column, which are pivotably mounted on a vehicle-fixed main bearing, and a front-side first frame element and a second frame element, which is arranged rearward of the first frame element in the closed position and is connected to the first frame element by way of a joint arrangement. When the convertible top rod assembly is being adjusted, the first frame element can be pivoted relative to the second element by means of an actuating link, which extends along the second frame element. In the closed position, in which the first frame element and the second frame element are substantially aligned to each other, the first frame element can be secured against pivoting relative to the second frame element by means of a locking element, which is mounted to rotate, interacts with a closing bolt and is adjustable between a locked position and an open position. In the case of the known convertible top, the closing bolt is arranged on the second frame element. Due to the arrangement of the closing bolt on the second frame element, it is necessary for the second frame element to extend in the longitudinal direction of the vehicle beyond the joint arrangement connecting the two frame elements in the direction of the first frame element. This in turn requires that the rear-side convertible top storage box is provided with sufficient dimensions in the longitudinal direction of the vehicle.

SUMMARY OF THE INVENTION

It is the object of the present invention to provide a convertible top of the kind mentioned in the introduction which requires less structural space when in its storage position. The object is attained by a convertible top of a cabriolet vehicle, said convertible top including a convertible top rod assembly having opposing sides, said convertible top rod assembly being movable between a closed position spanning the vehicle interior and a storage position and including a link arrangement on both sides, said link arrangement including a main link and a main column pivotably mounted on a main bearing, and a front-side first link element and a second link element, said second link element being arranged rearward of the first link element in the closed position and is connected to the first link element by a joint arrangement, wherein the first link element being pivotable relative to the second link element by an actuating link extending along the second link element the actuating link being connected to a knee lever arrangement connected to the first link element and the second link element; and a locking element secures the first link element against pivoting relative to the second link element in the closed position, said locking element being mounted to rotate and interact with a closing bolt and is adjustable between a locked position and an open position, wherein the closing bolt is arranged on the knee lever arrangement.

Consequently, it is the core of the invention that, in contrast to the state of the art, the locking bolt is repositioned onto a component, namely onto the knee lever arrangement, so that no protrusions or the like have to be provided on the second frame element for forming the closing bolt. Instead, when the convertible top rod assembly is actuated by pivoting the first link or frame element relative to the second link or frame element, the actuating link can be displaced in such a manner that, depending on the spatial conditions present in the respective vehicle, it can be introduced into the convertible top storage box. The actuating link can be arranged or repositioned in its entirety rearward of the front edge of the second frame element.

The actuating link is hinged to the knee lever arrangement, which is located between the first link element and the second link element. A first lever of the knee lever arrangement is connected to the first link element, and a second lever of the knee lever arrangement is connected to the second link element wherein the closing bolt is arranged on one of the levers. Starting from the closed position of the convertible top rod assembly, a pulling force, which acts from the actuating link in the rearward direction onto the knee lever arrangement, causes a pivoting of the first link element in the direction of the second link element.

Thus, the locking mechanism between the first link element or top link and the second link element or top link can be realized according to the invention with few components in a functionally safe and cost-saving manner. Space and weight are saved owing to an integration of functions in the convertible top rod assembly.

In a preferred embodiment of the convertible top according to the invention, the locking element, which is engaged with the closing bolt in the closed position of the convertible top rod assembly, is mounted on the first frame element. Thus, the locking element is pivoted together with the first frame element when the first frame element is pivoted in relation to the second frame element.

In a preferred embodiment of the convertible top according to the invention, the closing bolt also forms an abutment element for an abutting surface of the locking element in order to clearly define the open position of the locking element. This means that the abutting surface of the locking element abuts against the closing bolt in the closed position of the convertible top rod assembly when the locking element is adjusted into the open position.

In a convenient manner, the convertible top according to the invention comprises a drive device for the locking element. For example, the locking element is connected to the drive device via at least one link or one rod. In an alternative embodiment of the convertible top according to the invention, the drive device, which may be a hydraulic cylinder or an electric motor, for example, can be connected directly to the locking element.

In order to be able to actuate the locking element together with a closing arrangement, which secures the convertible top rod assembly in the closed position to a forward windshield cowl of the respective vehicle, the locking element can be hinged to a coupling rod, which is in turn hinged to a front-side locking hook of the closing arrangement.

To prevent the locking element and/or also the locking hook from being pivoted unintentionally into the opening direction in case the drive device fails, it is advantageous for the locking element to take a position beyond the dead center in relation to the coupling rod in its locked position. Only a torque that is introduced directly into the locking element can release the lock between the first link element and the second link element.

Further advantages and advantageous designs of the subject-matter of the invention can be taken from the description, the drawing and the patent claims.

BRIEF DESCRIPTION OF THE DRAWINGS

An exemplary embodiment of a convertible top according to the invention are illustrated in the drawing in a schematically simplified manner and are explained in more detail in the following description. In the figures.

DETAILED DESCRIPTION OF THE EXAMPLE EMBODIMENT

In FIGS. 1 to 6, a convertible top 10 of a vehicle embodied as a cabriolet is illustrated. The convertible top 10 comprises a convertible top rod assembly, which serves to expand a convertible top cover formed from a flexible, foldable material. The convertible top rod assembly 12 is adjustable between a closed position illustrated in FIG. 1, which spans a vehicle interior of the respective vehicle, and an open position, which opens the vehicle interior toward the top, in which it is placed in a rear-side convertible top box of the vehicle together with the convertible top cover.

Figure 1:
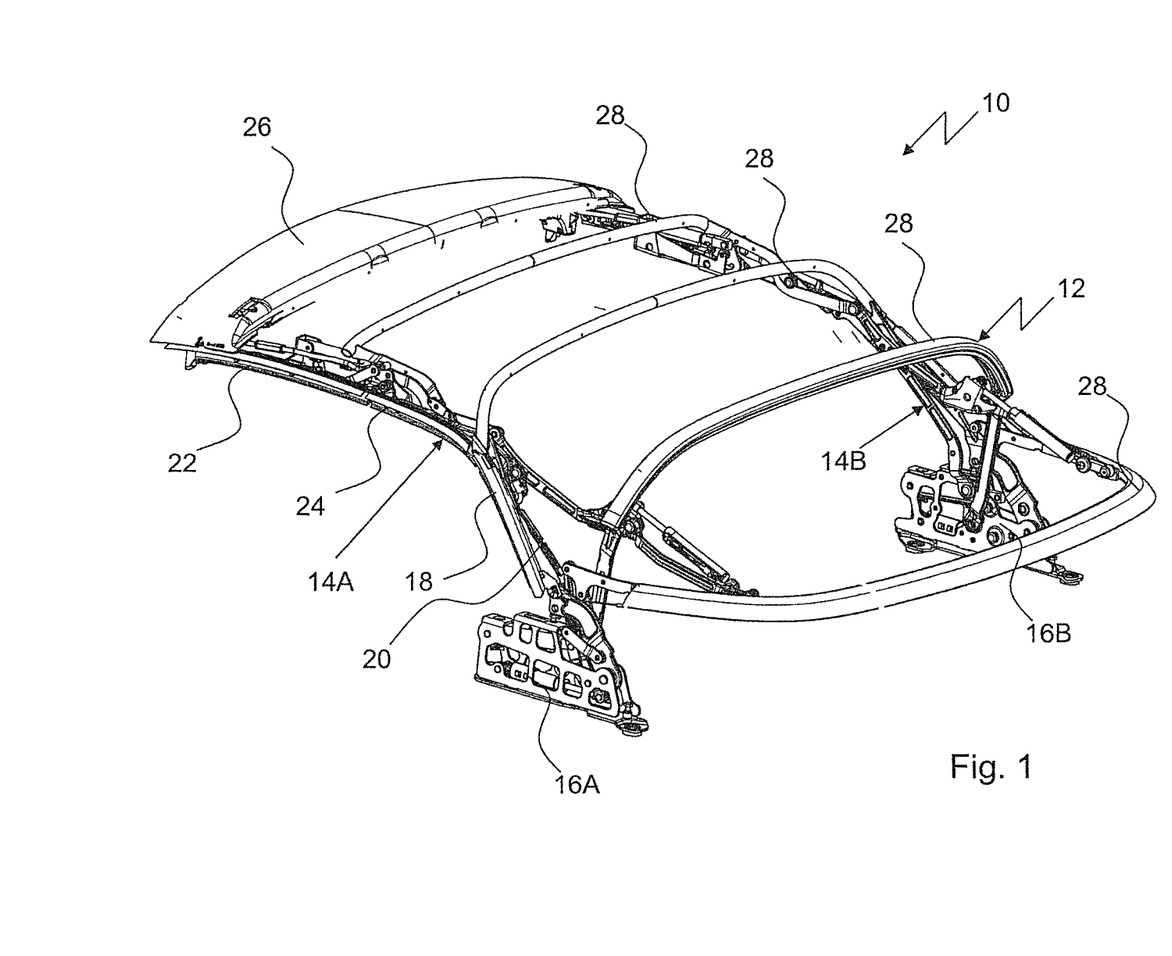
FIG. 1 shows a perspective view of a convertible top rod assembly of a convertible top according to the invention.

The convertible top rod assembly 12 comprises a link arrangement 14A and 14B on both sides, respectively, in relation to a vertical longitudinal center plane of the vehicle, said link arrangement being pivotably mounted on a respective main bearing 16A and 16B attached rigidly to the vehicle. The link arrangements 14A and 14B are formed mirror-symmetrically to each other. Hence, for the sake of clarity, the following description is based only on the link arrangement 14A arranged on the left side in the driving direction and the description translates directly to the link arrangement 14B arranged on the right side in the driving direction.

The link arrangement 14A, which is pivotably mounted on the main bearing 16A via a main column 18 and a main link 20, comprises a first link or frame element 22, which is arranged at the front side in the closed position of the convertible top, a middle second link or frame element 24, which is arranged rearward of the first link element 22 in the closed position of the convertible top, and a rear-side third frame element, which is formed by the main column 18. The first link element 22, the second link element 24 and the main column 18, which consequently form three frame elements of the convertible top rod assembly 12, laterally delimit the convertible top cover (not illustrated).

The forward first link elements 22 of the two link arrangements 14A and 14B, which are arranged on both sides, are connected to each other by way of a front bow 26, which is a rigid roof element, oftentimes also called front bow, and is adjacent to a forward windshield cowl of the respective vehicle in the closed position of the convertible top 10 and can be secured there. Furthermore, the two link arrangements 14A and 14B are connected to each other by further transverse bows 28, whose function will not be addressed in detail here.

In order to be able to secure the convertible top rod assembly 12 in its closed position, the convertible top 10 comprises a closing unit 30, which, on the one hand, secures the first link element 22 or the forward bow 26 to a locking device 32, which is arranged at the forward windshield cowl, and which, on the other hand, secures the forward link element in relation to the middle link element 24 against unintentional pivoting relative thereto.

The closing unit 30 comprises a locking hook 34, which is pivotably mounted by way of a bearing bolt 36 on the forward link element 22 and is engaged with a locking bolt 38 of the locking device 32 in its locked position.

Figure 2:
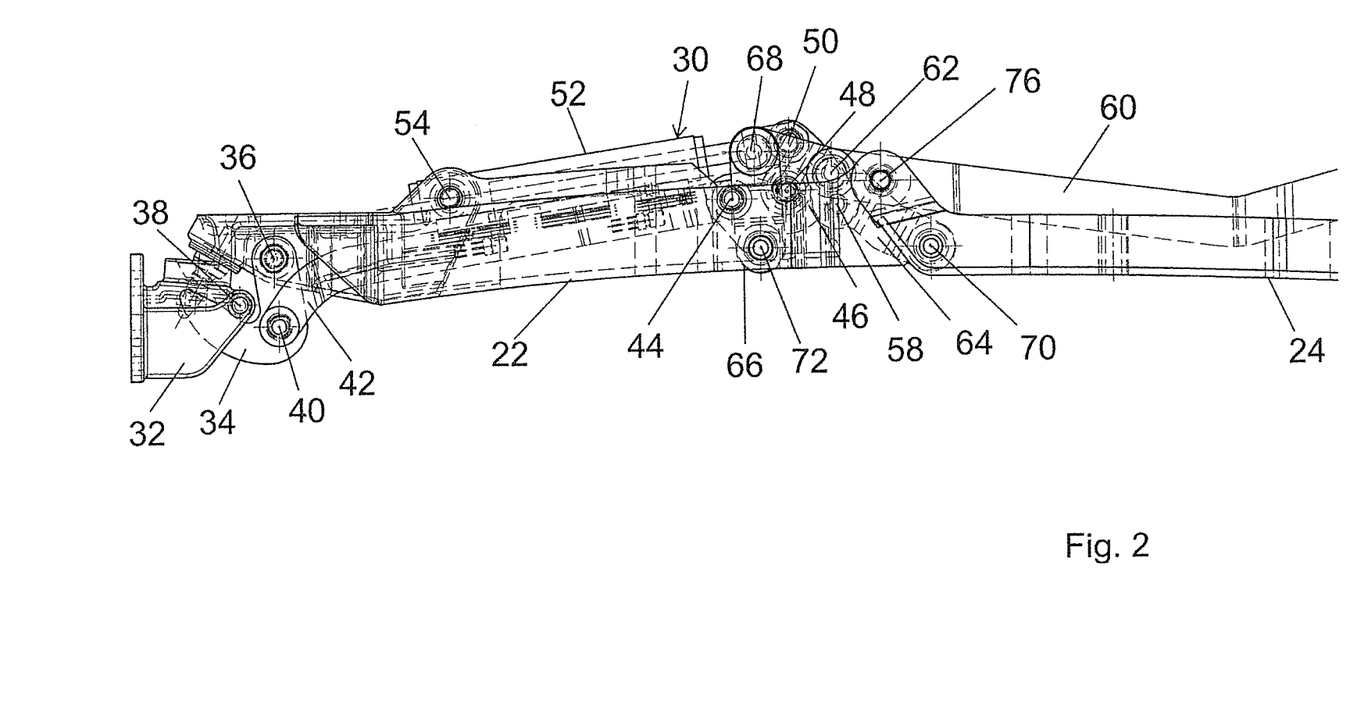
FIG. 2 shows a schematic lateral view of the convertible top rod assembly in a front-side section.

A coupling rod 42 is hinged to the locking hook 34 by way of a joint 40, said coupling rod 42 being hinged with its end facing away from the locking hook 34 by way of a joint 44 to a locking element 46, which is formed as a locking rocker, which is mounted in an end region of the forward link element 22, said end region being arranged at the rear side in the closed position of the convertible top rod assembly 12 illustrated in FIG. 2. The locking element 46 is mounted by means of a bearing bolt 48.

For drive, the locking element 46 is connected via a hinge point 50 to a hydraulic cylinder 52 embodying a drive device, which is supported with its end facing away from the hinge point 50 via a bearing bolt 54 on the forward link element 22.

The locking element 46, which is rotatably mounted on the forward link element 22, comprises a closing hook 56, which serves to prevent unintentional pivoting of the forward link element 22 in relation to the middle link element 24 in the secured position of the convertible top 10 on the forward windshield cowl. For this purpose, the closing hook 56 in its locked position is engaged to a closing bolt 58, which is formed on a lever 64 of knee lever arrangement located between the forwarded link element 22 and the middle link element 24.

An actuating link 60, in a manner not illustrated in detail here, is hinged to the main column 18 and to the main link 20 by way of respective joints in its end region facing away from the locking element 46. With its end facing away from the main link 20 and from the main column 18, the actuating link 60 is hinged via a joint 62 to the lever 64 of the knee lever arrangement, which is formed by the lever 64 and by a lever 66, which are connected to each other by way of a hinge point 68. At its end facing away from the hinge point 68, the lever 64 of the knee lever mechanism is connected by way of a joint 70 to the middle link element 24, whereas the lever 66 of the knee lever arrangement is connected at its end facing away from the hinge point 68 to the forward link element 22 by way of a joint 72. Starting from the closed position illustrated in FIG. 2, following an adjustment of the closing unit 30 in the open position, the forward link element 22 can be pivoted in relation to the middle link element 24, i.e. backward against the middle link element 24, by means of a pulling force, which acts in the direction of the rear and is effected by the actuating link 60 onto the knee lever arrangement formed by the levers 64 and 66.

The locking element 46 is formed in such a manner that it has an abutting surface 74, which serves as an abutment for the closing bolt 58 when the locking element 46 is adjusted into an open position in relation to the closing bolt 58 and thus defines an end position of the locking element 46. In this context, the forward link element 22 and the middle link element 24 are still in the extended position.

If now the forward link element 22 is pivoted in relation to the middle link element 24 by a pulling force acting in the rearward direction, which is effected by the actuating link 60 onto the lever 64 of the knee lever arrangement, the abutting surface 74 gains distance from the closing bolt 58, the closing bolt 58 being displaced in the rearward direction.

Figure 6:
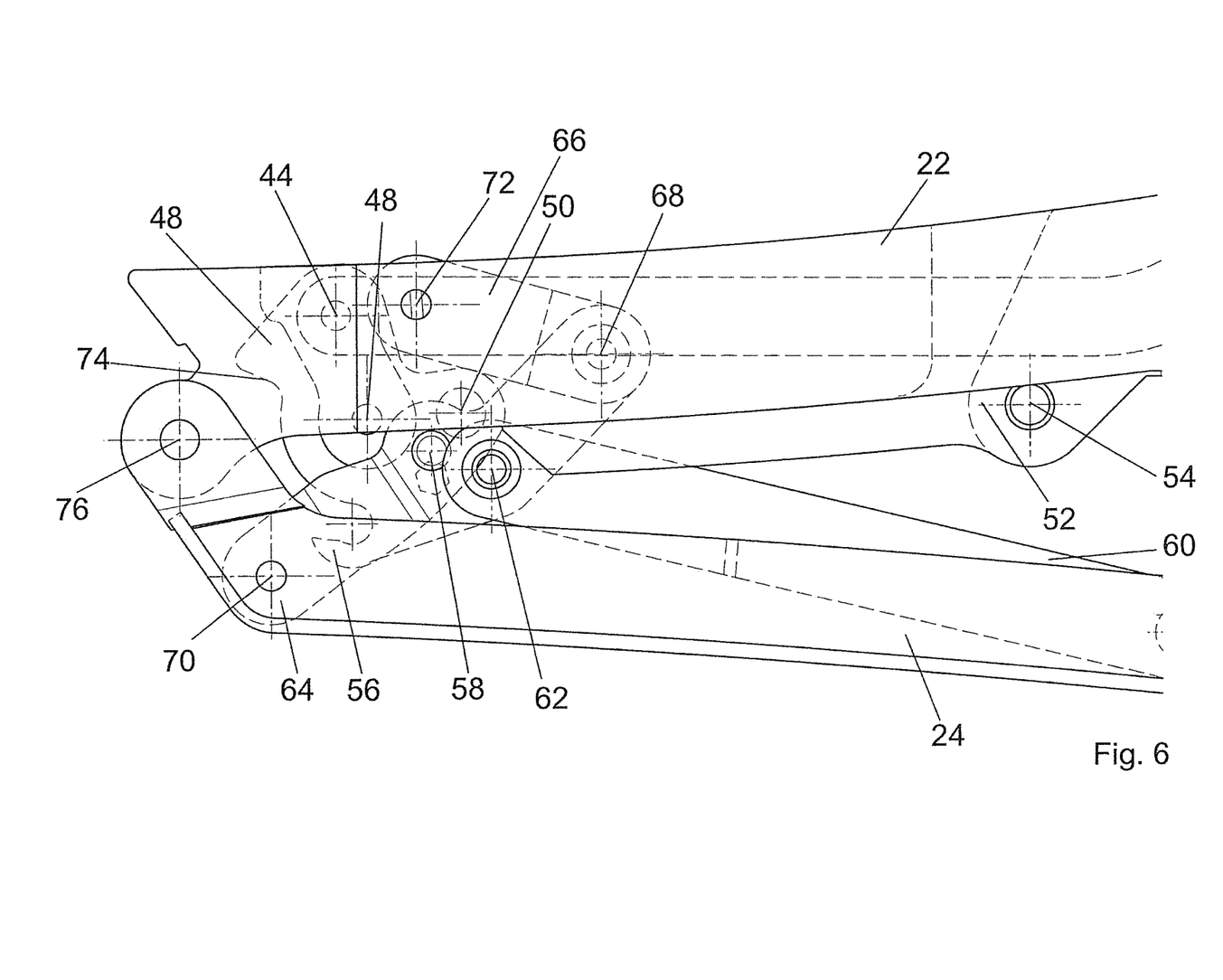
FIG. 6 also shows a view corresponding to FIG. 3, but in an end position after the pivoting of the front-side frame element in relation to the rear-side frame element.

In the storage position illustrated in FIG. 6 between the forward link element 22 and the middle link element 24, in which the forward link element 22 is folded against the middle link element 24 from the top, the joint area formed by a joint arrangement 76 between the middle link element 24 and the front-side link element 22 forms a front-side end of the convertible top rod assembly 12. The position of this joint area defines the dimensions of the convertible top storage box in the direction of the vehicle front.

Figure 3:
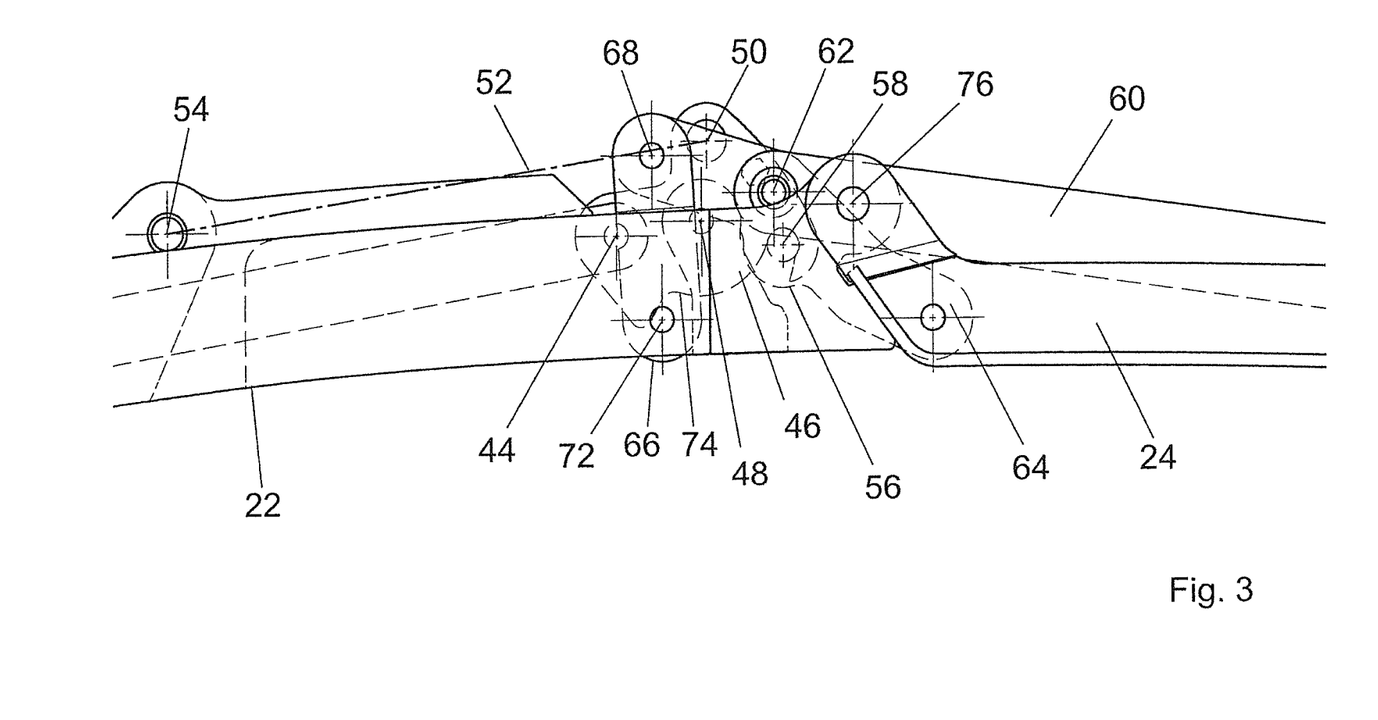
FIG. 3 shows a closing mechanism between a front-side frame element and a middle frame element of the convertible top rod assembly in the locked position.
Figure 4:
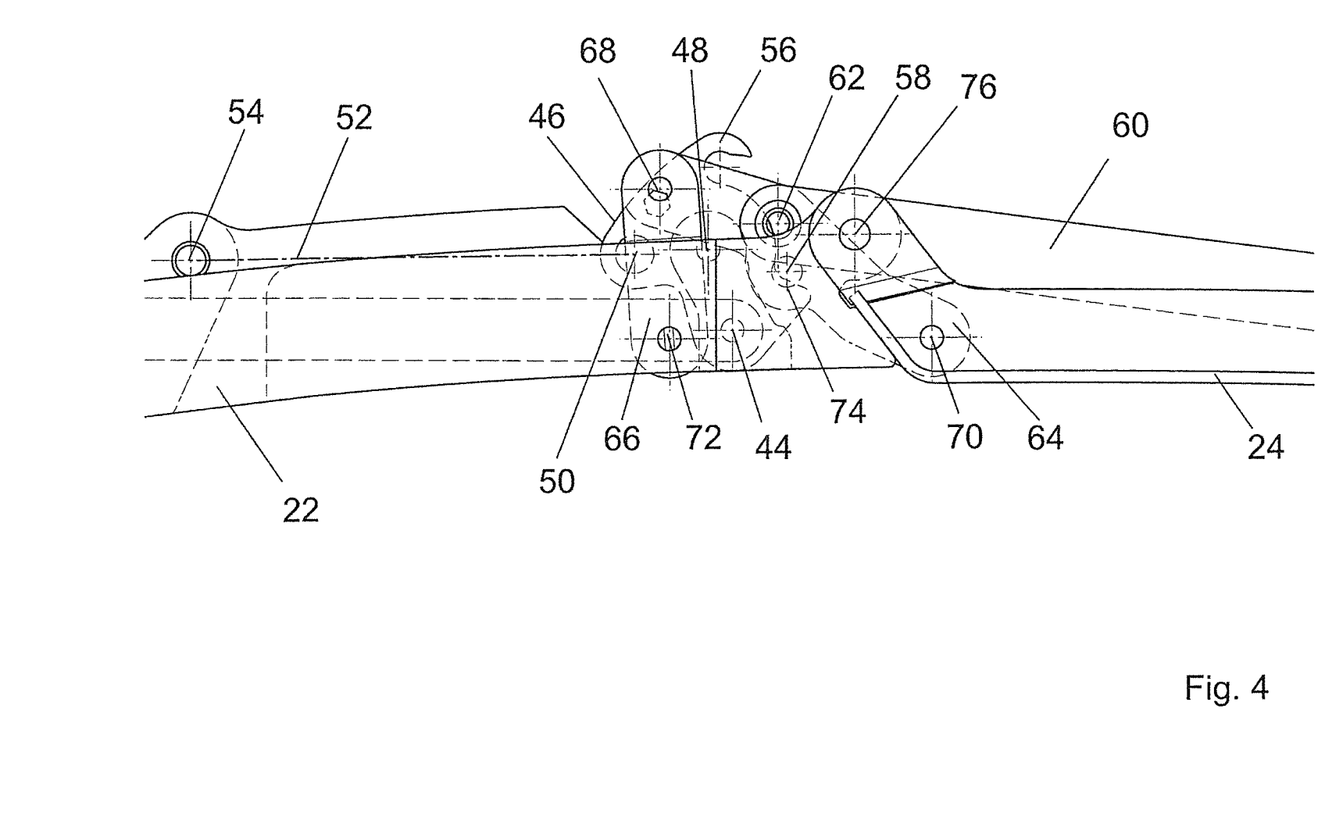
FIG. 4 shows a view corresponding to FIG. 3, but in the open position of the closing mechanism.
Figure 5:
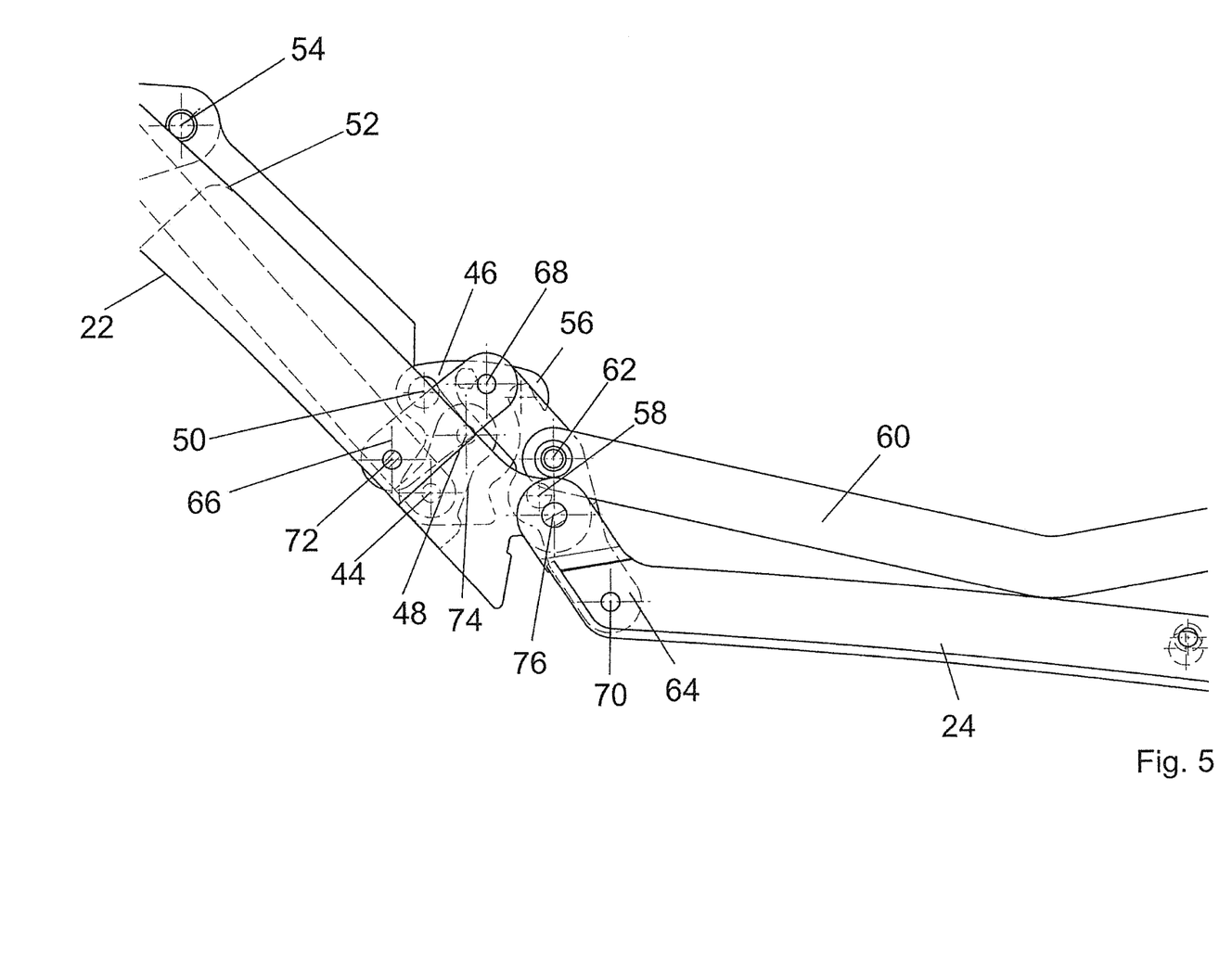
FIG. 5 also shows a view corresponding to FIG. 3, but during the pivoting of the front-side frame element in relation to the middle frame element.

The geometry of the locking element 46 and the hinging of the coupling rod 42 and of the hydraulic cylinder 52 to the locking element 46 are selected such that the locking element takes a position beyond the dead center in relation to the coupling rod in its closed position or locked position illustrated in FIGS. 2 and 3. This means that in case of failure of the drive unit for the closing unit 30, formed here as a hydraulic cylinder, potential opening forces effected onto the locking hook 34 cannot cause the locking hook 34 to unlock in relation to the locking bolt 38 and the closing hook 56 of the locking element 46 in relation to the closing bolt 58. Instead, the opening forces would induce a torque acting in the locking direction of the locking element 46 into the locking element 46. Hence, an unintentional release of the convertible top 10 for pivoting out of the closed position into the storage position is impossible.

The invention claimed is:

1. A convertible top of a cabriolet vehicle, said convertible top comprising:
a convertible top rod assembly having opposing sides, said convertible top rod assembly being movable between a closed position spanning a vehicle interior and a storage position and including a link arrangement on both sides, said link arrangement including a main link and a main column pivotably mounted on a main bearing, and a front-side first link element and a second link element, said second link element being arranged rearward of the first link element in the closed position and connected to the first link element by a joint arrangement, wherein the first link element being pivotable relative to the second link element by an actuating link extending along the second link element the actuating link being connected to a knee lever arrangement connected to the first link element and the second link element; and
a locking element securing the first link element against pivoting relative to the second link element in the closed position, said locking element being mounted to rotate and interact with a closing bolt and is adjustable between a locked position and an open position, wherein the closing bolt is arranged on the knee lever arrangement.

2. The convertible top according to claim 1, wherein the knee lever arrangement, which is arranged between the first link element and the second link element, includes a first lever connected to the first link element and a second lever connected to the second link element and to which the actuating lever is hinged, wherein the closing bolt is arranged on one of the levers.

3. The convertible top according to claim 1, wherein the locking element is mounted on the first link element, and, in the locked position in the closed position of the convertible top rod assembly, is engaged with the closing bolt.

4. The convertible top according to claim 1, wherein the locking element has an abutting surface, which in the closed position of the convertible top rod assembly abuts against the closing bolt when the locking element is moved into the open position.

5. The convertible top according to claim 1, wherein the locking element is connected to a drive device via at least one driving rod.

6. The convertible top according to claim 1, wherein a drive device is connected directly to the locking element.

7. The convertible top according to claim 1, wherein a coupling rod is hinged to the locking element, said coupling rod being hinged to a front-side locking hook, which can be secured to a forward windshield cowl of a vehicle in the closed position of the convertible top rod assembly.

8. The convertible top according to claim 7, wherein in the locked position, the locking element takes a position beyond a dead center in relation to the coupling rod.

* * * * *